United States Patent [19]
Stanley

[11] Patent Number: 5,244,646
[45] Date of Patent: Sep. 14, 1993

[54] PREVENTION OF BLOCKAGE OF CHARGE FEED TUBE IN SMELTING FURNACE

[75] Inventor: Earl K. Stanley, Frederick, Md.

[73] Assignee: Advance Metals Technology Corporation, Frederick, Md.

[21] Appl. No.: 804,373

[22] Filed: Dec. 10, 1991

[51] Int. Cl.$^5$ ............................................. C01B 31/02
[52] U.S. Cl. ..................................... 423/350; 266/265
[58] Field of Search ................. 75/529, 530; 423/350; 266/265

[56] References Cited
U.S. PATENT DOCUMENTS 3,215,522 11/1965 Kuhlmann ........................... 423/350
3,960,546 6/1976 Rote ..................................... 75/530

Primary Examiner—Peter D. Rosenberg
Attorney, Agent, or Firm—Dickinson, Wright, Moon, Van Dusen & Freeman

[57] ABSTRACT

A furnace for the production of silicon metal or a silicon containing alloy includes a charge feed tube for supplying a silicon containing charge to a reaction zone. Silicon monoxide gas generated in the reaction zone is allowed to rise through the tube and is combined with natural gas that has been introduced into the top of the tube. The natural gas and the silicon monoxide combine to form silicon carbide which is carried back into the furnace with the charge.

14 Claims, 1 Drawing Sheet

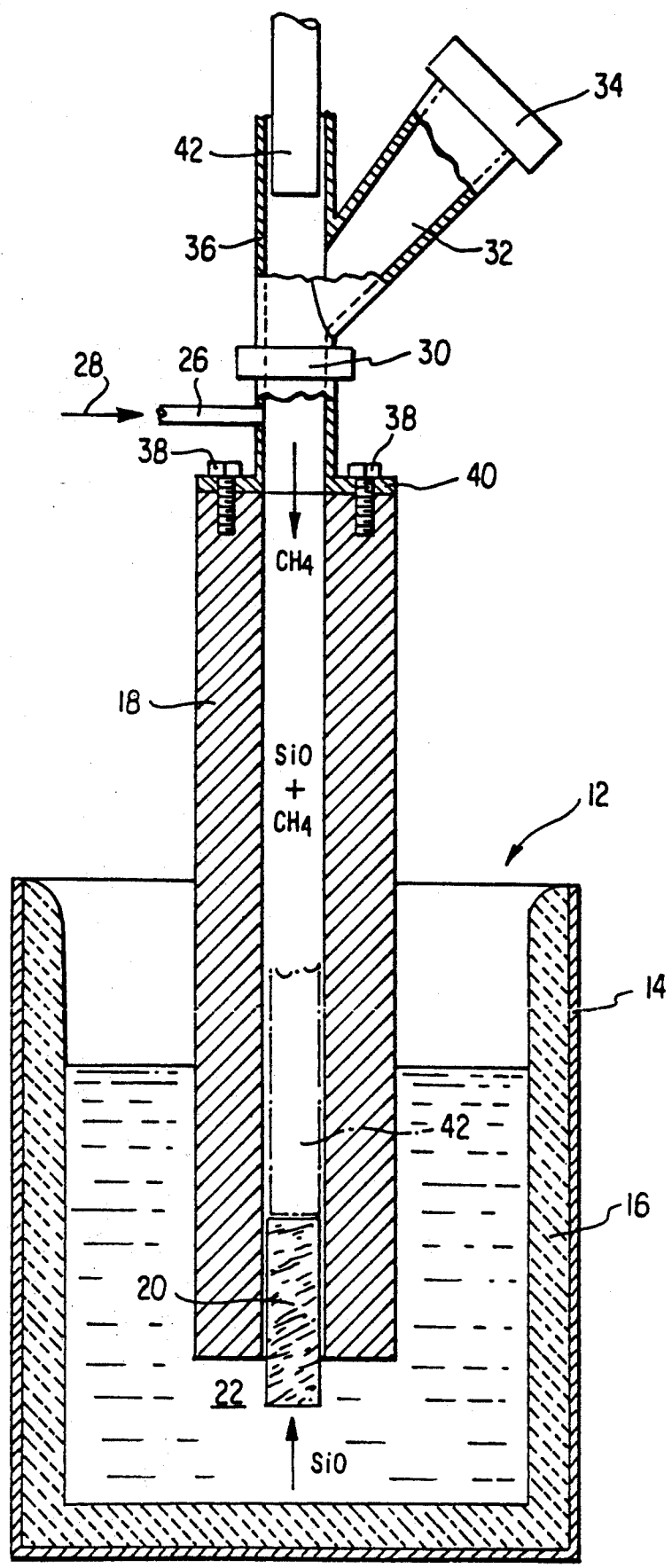

PREVENTION OF BLOCKAGE OF CHARGE FEED TUBE IN SMELTING FURNACE

TECHNICAL FIELD

This invention relates to the art of smelting furnaces and, in particular, to the art of furnaces for the production of silicon metal or alloys containing silicon wherein charging material is fed into the furnace reaction area through a tube.

BACKGROUND ART

Furnaces for the production of silicon metal which employ a tube for feeding the charge into the furnace reaction area are known. For example, furnaces for the production of silicon metal which provide charge feed tubes are described in U.S. Pat. Nos. 4,756,004 (Stanley); 4,756,813 (Stanley et al.); and 4,865,643 (Goins, Jr. and Stanley).

A typical furnace for the production of silicon metal or a silicon metal alloy (e.g., a ferro-silicon alloy) supplies a source of silicon, such as silicon dioxide, to the reaction zone of the furnace. The reaction of a silicon containing material with an oxide also produces silicon monoxide gas which may exit the furnace. When a charge feed tube is used, the silicon monoxide gas can rise through the feed tube.

A problem that has long existed in this type of furnace is that the charge feed tube becomes blocked, which prevents further feeding of charge into the furnace reaction area and requires the furnace to be shut down to remove the blocking material. Of the many prior designs for furnaces with charge feed tubes, none has been successful in avoiding blockage of the feed tube.

SUMMARY OF THE INVENTION

Applicant has discovered that the primary cause of blockage of feed tubes in furnaces for making silicon or silicon containing alloys is the back reaction of the silicon monoxide gas in the tube. As an unavoidable product of the reaction between a silicon containing material and an oxide the silicon monoxide gas rises through the center of the charge feed tube and cools. When the temperature of the silicon monoxide gas falls below about 1800° C., it begins to back react with itself as $$2SiO \rightarrow SiO_2 + Si. \tag{1}$$

This back reaction product forms a lining on the wall of the tube which eventually grows and blocks the tube. Moreover, because all of the products of the back reaction of silicon monoxide gas are solid phase, the gas pressure in the tube is reduced, which allows additional upward flow of silicon monoxide gas from the furnace.

One prior attempt to prevent the flow of silicon monoxide gas up the tube was to force high velocity nitrogen gas downward through the tube to create back pressure to oppose the flow of silicon monoxide gas. This was not successful, among other reasons, because the volume of nitrogen gas required to counteract the flow of silicon monoxide was so large that the furnace cooled too much.

In accordance with the invention, the blockage caused by the back reaction of silicon monoxide gas is prevented by reacting the silicon monoxide gas flowing in the feed tube with a selected compound which results in reaction products which do not clog the tube. This compound is preferably a gas which can be flooded into the upper part of the tube to ensure that substantially all of the silicon monoxide gas is reacted to prevent formation of the coating of silicon and silicon dioxide on the interior of the tube. In addition, the silicon containing product of the reaction between the added compound and the silicon monoxide is carried back into the furnace for recovery of the silicon.

In the preferred embodiment, the upper part of the tube is flooded with a gaseous hydrocarbon, preferably natural gas ($CH_4$), which reacts with the silicon monoxide to produce silicon carbide. The tube may be supplied with silicon dioxide as the source of silicon for the furnace, and the resulting silicon carbide is carried down the tube with the silicon dioxide to produce silicon metal, silicon monoxide and carbon monoxide as the temperature rises.

An additional advantage of the invention is that the reaction of silicon monoxide gas with natural gas produces gaseous carbon monoxide and hydrogen. These gasses create back pressure and further reduce the upward flow of silicon monoxide gas.

BRIEF DESCRIPTION OF THE DRAWINGS

The FIGURE is a vertical cross section of a furnace in accordance with the invention.

DETAILED DESCRIPTION OF THE PREFERRED EMBODIMENT

The FIGURE shows a furnace of the type useful for production of silicon or a silicon containing alloy and modified in accordance with the principles of the invention to prevent the back reaction of silicon monoxide gas and thus prevent blockage of the feed tube.

A crucible 12 is formed by an outer wall 14 and refractory 16 to provide a reaction zone as known in the art. A hollow charge feed tube 18 is held centrally (in known manner) in the crucible, and a charge 20 of a silicon containing material is fed through the central opening of the feed tube 18 into the crucible. The charge 20 is fed into a reaction zone 22, and silicon monoxide gas is produced in the furnace from the starting materials by the reaction of the silicon and oxygen in the charge materials.

As the SiO rises through the center of the charge feed tube, it cools and would begin to back react when the temperature falls below about 1800° C. This back reaction is prevented, however, by supplying a hydrocarbon gas 28 through inlet 26. The hydrocarbon gas 28, preferably natural gas ($CH_4$), flows through the center of the charge feed tube 18 to mix with the SiO gas rising through the tube.

A lower slide valve 30 is provided to close the top of the center of the feed tube 18 as the natural gas is introduced. The feed tube is designed such that the natural gas fills the upper part of the feed tube and engages the rising SiO gas when it is above the temperature at which significant back reaction of the SiO occurs. The natural gas reacts with the SiO in the upper part of the tube as:

$$2CH_4 + SiO \rightarrow SiC + CO + 4H_2 \tag{2}$$

The SiC produced by this reaction is carried down the center of the feed tube with the other charge materials to the reaction zone to react and produce silicon when the temperature is high enough. The CO and $H_2$ gasses generated by reaction (2) create a back pressure which further inhibits upward flow of the SiO gas.

The wall of the feed tube may be porous to the CO and $H_2$, whereby these gasses pass through the wall and burn in the region which surrounds the feed tube. Alternatively, the CO and $H_2$ exit the bottom of the feed tube and exit the furnace along with other gasses.

Charging the furnace is accomplished by the use of a feed hopper 32, which includes a second slide valve 34 and connects to a pipe 36. The pipe 36 is held to the upper part of the feed tube by any of several methods, bolts 38 and flange 40 being illustrated in the FIGURE. A ram 42 is shown in a rest position above the intersection of the hopper and the pipe.

A new charge is added by opening valve 34 and filling the hopper 32. Then, the valve 34 is closed and the valve 30 is opened. While some of the charge materials may immediately fall through the center of the feed tube without assistance, the ram 42 is pushed down the center of the feed tube to ensure that all of the charge moves into the reaction zone of the furnace. The lowermost position of the ram 42 is shown in phantom lines in the figure.

After the charge has been pushed into the furnace, the ram is withdrawn to the position shown in solid lines, and the valve 30 is closed.

Modifications of the described invention within the scope of the following claims will be apparent to those of skill in the art.

I claim:

1. In a furnace of the type having exit means for permitting a gas to exit from a reaction zone of said furnace, the temperature of said exit means at a location remote from said reaction zone being such that said gas can change to another physical state and block said exit means, the improvement comprising means for supplying a reactant to said gas when said gas is greater than said temperature for producing reaction products from said gas and said reactant which do not block said exit.

2. A furnace according to claim 1 wherein said another physical state is a back reaction product of said gas.

3. A furnace according to claim 1 wherein said another physical state arises from condensation of said gas.

4. A furnace according to claim 1 wherein said exit means comprises means for supplying raw material to said reaction zone.

5. A furnace according to claim 4 wherein said gas comprises an oxide of a metal product of said reaction zone.

6. A furnace according to claim 2 wherein said gas is silicon monoxide and said reactant comprises a hydrocarbon.

7. A furnace according to claim 6 wherein said hydrocarbon is methane.

8. A furnace according to claim 2 wherein said exit means comprises a hollow electrode.

9. A method for preventing clogging of a tube by a change of state of a gas passing through said tube, said change of state occurring at or below a temperature of said gas attained by cooling of said gas as it passes through said tube, comprising combining said gas with a reactant when the temperature of said gas is greater than said temperature to produce reaction products which will not clog said tube.

10. A method for producing silicon or a silicon containing alloy comprising supplying a silicon containing charge through a tube to a smelting zone and chemically reducing said charge to produce silicon and silicon monoxide gas, allowing said silicon monoxide gas produced in said smelting zone to exit said smelting zone through said tube, and supplying a reactant to said silicon monoxide gas at a location remote from said smelting zone and where the temperature of said silicon monoxide gas is greater than the temperature at which significant back reaction of said silicon monoxide gas commences for preventing back reaction of said silicon monoxide.

11. A method according to claim 10 wherein said reactant comprises methane.

12. A method according to claim 11 wherein said methane is natural gas.

13. A method according to claim 10 wherein said reactant is supplied counter current to said silicon monoxide gas.

14. In a process for making elemental silicon by reacting silicon dioxide with a carbonaceous material that generates elemental silicon and a reaction gas that rises through a hollow electrode, the improvement comprising introducing a gas that reacts with said reaction gas in said hollow electrode to produce a reaction product that is transported to said furnace.

* * * * *